US011681991B1

(12) United States Patent
Sherman et al.

(10) Patent No.: US 11,681,991 B1
(45) Date of Patent: *Jun. 20, 2023

(54) SYSTEM AND METHOD FOR MOBILE CHECK DEPOSIT

(71) Applicant: Wells Fargo Bank, N.A., San Francisco, CA (US)

(72) Inventors: David Joel Sherman, Haywood, CA (US); Nishant Usapkar, San Ramon, CA (US); Katie Knight, Erie, CO (US); Ranjit S. Pradhan, Menlo Park, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/337,217

(22) Filed: Jun. 2, 2021

Related U.S. Application Data

(63) Continuation of application No. 16/517,453, filed on Jul. 19, 2019, now Pat. No. 11,037,109, which is a
(Continued)

(51) Int. Cl.
*G06Q 20/04* (2012.01)
*G06Q 20/32* (2012.01)
(Continued)

(52) U.S. Cl.
CPC ........ *G06Q 20/042* (2013.01); *G06Q 20/3223* (2013.01); *G06T 1/0007* (2013.01); *G06V 30/2253* (2022.01); *G06Q 20/0425* (2013.01)

(58) Field of Classification Search
CPC .... G06K 9/186; G06T 1/0007; G06Q 20/042; G06Q 20/0425
See application file for complete search history.

(56) References Cited

U.S. PATENT DOCUMENTS 5,917,965 A    6/1999  Cahill et al.
6,453,079 B1 * 9/2002  McInerny ............ G06V 10/987
                                                    382/311
(Continued)

FOREIGN PATENT DOCUMENTS

CA    2316090 A1    2/2001
CA    2753913 A1    5/2011
(Continued)

OTHER PUBLICATIONS

Furst et al., "Internet Banking: Developments and Prospects", Economic and Policy Analysis Working Paper Sep. 2000. (Sep. 2000).
(Continued)

*Primary Examiner* — Utpal D Shah
(74) *Attorney, Agent, or Firm* — Foley & Lardner LLP

(57) ABSTRACT

Machine-readable storage media having instructions stored therein that, when executed by a processor of a mobile device, configure the mobile device to capture a check image for funds to be deposited into a recipient account. The mobile device configured to display a request to a user of the mobile device to provide one or more portions of a MICR line for the received check image and receive user inputs from the user specifying the one or more portions of the MICR line. The mobile device configured to transmit a message to a bank account computer system associated with the recipient account, the message including data specifying the one or more portions of the MICR line.

20 Claims, 7 Drawing Sheets

Related U.S. Application Data continuation of application No. 15/229,839, filed on Aug. 5, 2016, now Pat. No. 10,360,539, which is a continuation of application No. 14/300,089, filed on Jun. 9, 2014, now Pat. No. 9,424,569, which is a continuation of application No. 13/527,493, filed on Jun. 19, 2012, now Pat. No. 8,768,038.

(51) Int. Cl.
  *G06T 1/00* (2006.01)
  *G06V 30/224* (2022.01)

(56) References Cited

U.S. PATENT DOCUMENTS

| | | | |
|---|---|---|---|
| 7,379,978 B2 * | 5/2008 | Anderson | G06Q 20/00 705/40 |
| 7,752,286 B2 * | 7/2010 | Anderson | G06Q 20/00 718/1 |
| 8,083,136 B1 | 12/2011 | Brown et al. | |
| 8,379,914 B2 * | 2/2013 | Nepomniachtchi | G06Q 20/042 382/102 |
| 8,392,332 B1 | 3/2013 | Oakes et al. | |
| 8,573,483 B1 * | 11/2013 | Crews | G07F 7/04 902/8 |
| 8,768,038 B1 | 7/2014 | Sherman et al. | |
| 8,959,033 B1 | 2/2015 | Oakes et al. | |
| 2005/0035193 A1 | 2/2005 | Gustin et al. | |
| 2005/0133587 A1 | 6/2005 | Michelassi et al. | |
| 2007/0122024 A1 | 5/2007 | Haas et al. | |
| 2007/0136198 A1 | 6/2007 | Foth et al. | |
| 2008/0021830 A1 * | 1/2008 | Apergis | G06Q 40/00 705/45 |
| 2008/0140579 A1 * | 6/2008 | Sanjiv | G06Q 30/0236 705/76 |
| 2009/0171827 A1 | 7/2009 | Callahan et al. | |
| 2010/0268690 A1 * | 10/2010 | Anderson | G06Q 20/042 707/661 |
| 2011/0128566 A1 * | 6/2011 | Eum | H04N 1/00872 358/1.14 |
| 2011/0134248 A1 * | 6/2011 | Heit | H04N 1/00286 348/161 |
| 2011/0228308 A1 | 9/2011 | Goldman et al. | |
| 2012/0008851 A1 * | 1/2012 | Pennock | G06V 30/2253 382/140 |
| 2012/0029969 A1 | 2/2012 | Franke et al. | |
| 2013/0028502 A1 * | 1/2013 | Nepomniachtchi | G06V 10/243 382/137 |
| 2013/0085935 A1 * | 4/2013 | Nepomniachtchi | H04N 1/00129 705/40 |
| 2013/0110724 A1 * | 5/2013 | Edwards | G06Q 20/042 705/45 |
| 2013/0204783 A1 | 8/2013 | Klose et al. | |
| 2013/0212008 A1 * | 8/2013 | Edwards | G06Q 20/381 705/39 |
| 2014/0040248 A1 | 2/2014 | Walsham | |
| 2014/0067661 A1 | 3/2014 | Elischer | |

FOREIGN PATENT DOCUMENTS

| | | | |
|---|---|---|---|
| CA | 2756913 A1 | 5/2012 | |
| WO | WO2005/0048151 A1 | 5/2005 | |

OTHER PUBLICATIONS

Adam J. Levitin, "Remote Deposit Capture: A Legal and Transactional Overview," Banking Law Journal 126, No. 2 (Feb. 2009): 115-122. (Year: 2009).

Pervasive Image Capture and the Fist Amendment: Memory, Dicourse, and the Right to Record.

* cited by examiner

SYSTEM AND METHOD FOR MOBILE CHECK DEPOSIT

CROSS-REFERENCE TO RELATED APPLICATIONS

This application is a continuation of U.S. patent application Ser. No. 16/517,453, titled "SYSTEM AND METHOD FOR MOBILE CHECK DEPOSIT," filed on Jul. 19, 2019, which is a continuation of U.S. patent application Ser. No. 15/229,839, titled "SYSTEM AND METHOD FOR MOBILE CHECK DEPOSIT," filed on Aug. 5, 2016, which has granted as U.S. Pat. No. 10,360,539, which is a continuation of U.S. patent application Ser. No. 14/300,089, titled "SYSTEM AND METHOD FOR MOBILE CHECK DEPOSIT," filed on Jun. 9, 2014, which has granted as U.S. Pat. No. 9,424,569, which is a continuation of U.S. patent application Ser. No. 13/527,493, titled "SYSTEM AND METHOD FOR MOBILE CHECK DEPOSIT," filed on Jun. 19, 2012, which has granted as U.S. Pat. No. 8,768,038. The contents of each of the above-noted applications are herein incorporated by reference in their entireties and for all purposes.

BACKGROUND

Checks are routinely used to transfer funds from an individual's or businesses' account to another individual or business. At the same time, most people carry some type of mobile handheld electronic device, such as a cellular phone, smart phone, mobile handheld wireless e-mail device, personal digital assistant, portable gaming devices, and so on. Most of these devices have a wireless internet connection. A person may wish to deposit the funds in their financial institution accounts using these mobile devices.

SUMMARY OF THE DISCLOSURE

One embodiment relates to a computer-implemented method that includes receiving, from a mobile device, a check image for funds to be deposited into a recipient account and requesting manual entry of one or more portions of a MICR line for the check image, including highlighting the one or more portions of the MICR line. The method includes receiving the one or more manually entered portions of MICR line from the mobile device such that the MICR line identifies at least a routing number and an account number of a sender account that is a source of the funds to be transferred to the recipient account and transferring the funds from the sender account identified by the MICR line to the recipient account.

One embodiment relates to a computer-implemented method that includes receiving a check image for funds to be deposited into a recipient account designated by the user of the mobile device. The method includes requesting the user of the mobile device to provide one or more portions of a MICR line for the received check image, including highlighting the one or more portions of the MICR line for the user to edit and receiving the one or more portions provided by the user from the mobile device that completes the MICR line to include at least a routing number and an account number of a sender account that is a source of the funds to be transferred into the recipient account designated by the user. The method includes transferring the funds from the sender account identified by the MICR line into the recipient account designated by the user of the mobile device.

One embodiment relates to a computer-implemented method for a mobile device that includes an image capture device configured to capture a check image to deposit funds from the account information on the check to a recipient account. The mobile device includes a display device configured to prompt a user to provide one or more portions of a MICR line, the display device being configured to highlight the one or more portions of the MICR line for the user to edit. An input device of the mobile device may be configured to generate a keyboard that allows a user to enter characters of the MICR line. The mobile device being configured to send the one or more portions of the MICR line that when combined with the other portions of the MICR line identifies at least a routing number and an account number for a sender account that is a source of the funds to be transferred to the recipient account.

Machine-readable storage media having instructions stored therein that, when executed by a processor of a mobile device, configure the mobile device to capture a check image for funds to be deposited into a recipient account. The mobile device configured to display a request to a user of the mobile device to provide one or more portions of a MICR line for the received check image and receive user inputs from the user specifying the one or more portions of the MICR line. The mobile device configured to transmit a message to a bank account computer system associated with the recipient account, the message including data specifying the one or more portions of the MICR line.

One embodiment relates to a financial institution computing system associated with a financial institution. The financial institution computing system includes a network interface structured to connect the financial institution computing system to a network and a mobile check deposit system structured to receive a check image captured by a mobile device. The mobile check deposit system includes MICR scanning logic structured to determine one or more characters included in an MICR line of the check image, MICR request logic structured to request a manual input, by a user, comprising at least a portion of the MICR line of the check image, and check deposit logic structured to receive the MICR line and trigger a transfer of funds to an account.

DETAILED DESCRIPTION

Figure 1:
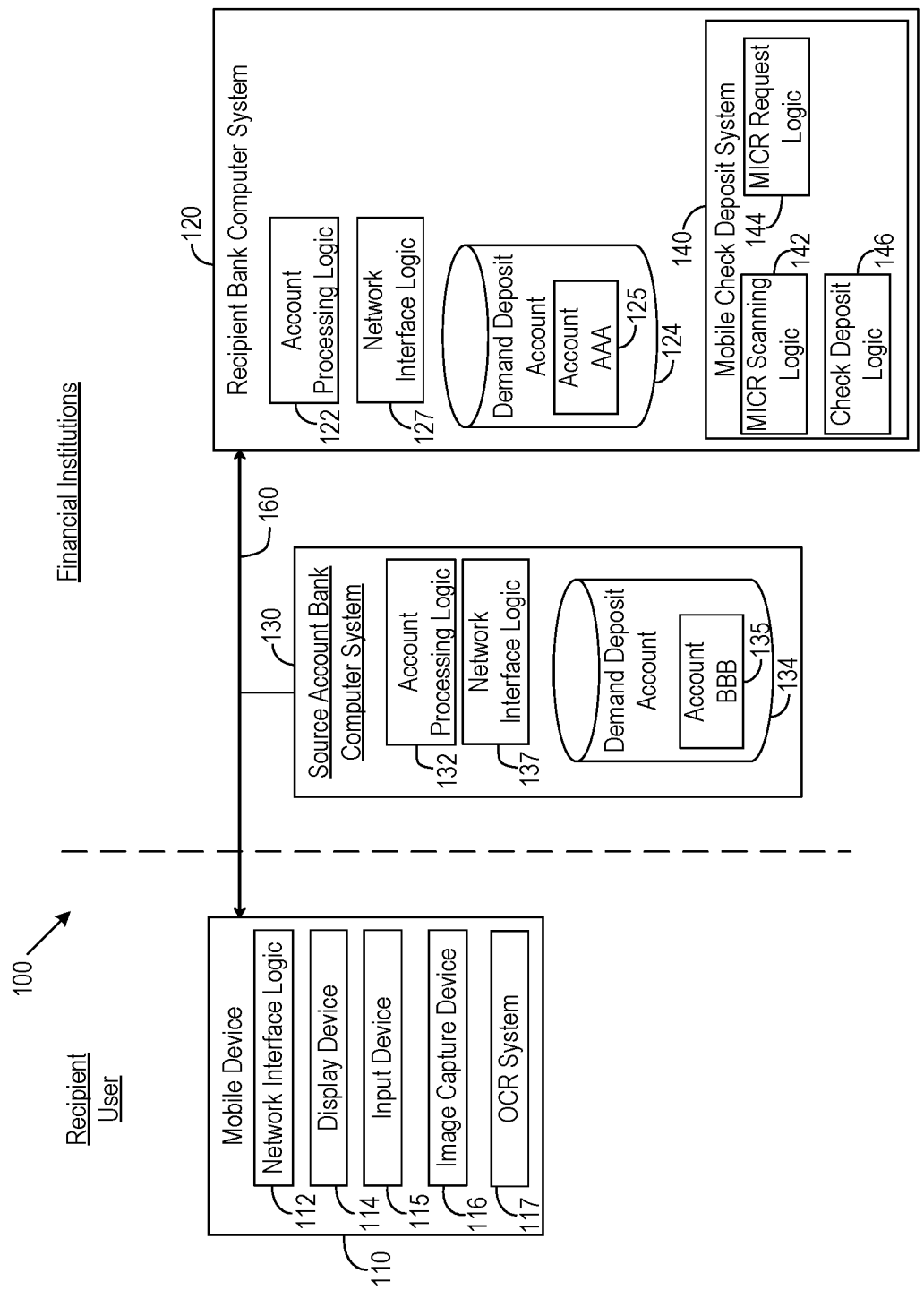
FIG. 1 is a schematic diagram of a computer-implemented payment processing system according to an example embodiment.

Referring to FIG. 1, a computer-implemented check processing system 100 is shown that may be used by a user to set up and utilize a mobile device for depositing checks. The recipient user may be a business entity and/or an individual consumer that has one or more recipient accounts with a financial institution. The recipient account may be a business or consumer account. The device can be used to transmit check images and data to the recipient bank computer system 120. Additionally, funds can be transferred from the source account bank to the recipient account bank. Alternatively, the source account and the recipient account can be held at a single financial institution.

Check processing system 100 may include, among other systems, a mobile device 110, recipient bank computer system 120, source account bank computer system 130, and the automated clearing house system 150. The mobile device 110, recipient bank computer system 120, source account bank computer system 130, and an automated clearing house system 150 may communicate through a network 160, which may include one or more of the Internet, cellular network, Wi-Fi, Wi-Max, a proprietary banking network, and so on. The mobile device 110, recipient bank computer system 120, source account bank computer system 130, and the automated clearing housing system 150 may each comprise a computer system (e.g., one or more servers each with one or more processors) configured to execute instructions, send and receive data stored in memory, and perform other operations to implement the operations described herein associated with logic or processes shown in FIGS. 2 through 4.

The mobile device 110 can be configured to access resources provided by a financial institution using an application or a web browser with a connection to a network (e.g. the Internet). The financial institution may publish applications to the user mobile device 110 using various digital online marketplaces. The name or web address of the marketplace may depend on the operating system of the mobile device 110. The individuals may, for example, use the mobile device 110 to perform banking tasks such as making deposits. Examples of operating systems include iOS®, Windows Phone®, Symbian®, Android®, Blackberry®, WebOs®, and so on.

The mobile device 110 may allow a recipient of a check to deposit the funds from the check writer's account to a financial institution account owned by the recipient. The mobile device 110 may send information that is on the check to the financial institution to receive funds from the check writer's account. Although in the illustrated embodiment the mobile device 110 is used to deposit a check using a financial institution application, it will be appreciated that the mobile device may deposit a check using different mechanisms, for example, through an online banking area of a web site of the banking institution that allows a user to upload the image of check.

The mobile device 110 may be used by an individual user (e.g., a business owner or employee, a consumer, and so on) to deposit funds to an account. The mobile device may, for example be, a cellular phone, smart phone, mobile handheld wireless e-mail device, personal digital assistant, portable gaming devices, tablet, laptop, camera or other suitable device. The mobile device 110 comprises a network interface logic 112, display device 114, input device 115, image capture device 116, and OCR system 117. Network interface logic 112 may include, for example, program logic that connects the mobile device 110 to the network 160. As described in greater detail below, for example, the mobile device 110 may receive and display screens for mobile check deposit, special keyboard for inputting (Magnetic Ink Character Recognition) MICR line information, account information, transaction instructions, and so on. In an example embodiment, such screens may be used to request authentication information (e.g. username and password). Such screens may also be used to prompt the user to provide information regarding the amount of the funds written on the check and which business or individual has paid the recipient by a check. Such screens are presented to the user via the display device 114. For example, the recipient may be prompted to provide the name, address, phone number, e-mail, and so on, of the sender. The recipient may also be prompted to select the sender from contacts stored on the mobile device 110 or to enter information about the sender from memory. The input device 115 may be used to permit the user to initiate account access and to facilitate receiving requested information from the user (e.g. MICR line symbols, account number and/or routing number). As will be appreciated, in addition to or instead of the mobile device 110, users may also be provided with the ability to access the check processing system 100 using another type of computer (e.g., a desktop or laptop computer executing browser software) to perform the operations described herein as being performed by the mobile device 110.

The display device 114 may be configured to generate images and a user interface for the user of the mobile device 110. For example, the display device 114 may prompt the user to enter the check information regarding a check deposit transaction. The display device 114 provides visual feedback to the user when the user attempts to use the image capture device 116 to capture an image of a check. In one example, the display device 114 may display guides over the image generated by the image capture device 116 to allow the user to frame the image of the check within a desired area of the screen. The display device 114 can be located on an opposing side of the mobile device 110 as the image capture device 116. The opposing orientation of the image capture device 116 compared to the display device allows a user to view the display device while the image capture device 116 is facing away from the user. In other mobile devices, the display device 114 can also be located on the same side of the mobile device 110 as the image capture device 116. Other mobile devices can include a plurality of image capture devices 116.

The input device 115 can be a touch device, keyboard or special touch keyboard that is connected to or generated by the mobile device 110 or an application on the mobile device 110. The special keyboard may include characters that are found in the MICR line of a check. Numerical characters and other MICR line characters such as, ⑆, ⑈, ⑇, ⑉ may be part of the keyboard and may be displayed on the keyboard for a user to input the unrecognized characters using the input device 115.

The image capture device 116 may comprise a camera, scanner or other suitable image capture devices that is configured to capture the image of a check. The image capture device 116 can include one or more lenses and an image sensor configured to record the images on the memory system of the mobile device 110. The image capture device 116 can be integrated into the body of the mobile device 110. The image capture device 116 may be configured to capture an image of a written instrument such as a check, cashiers check, bank check or other types of negotiable instruments and store the image on the mobile device 110 for transmission to a financial institution. As will be appreciated, the recipient may also use other devices (e.g., laptop or desktop computer system, not shown) to capture and transmit an image of a check to the financial institution.

Upon receiving the image of the check captured by the image capture device 116, the mobile device 110 may request that the OCR system 117 determine the location of the MICR line and the characters in the MICR line. The OCR system 117 can be an application stored on the mobile device 110 or the OCR system 117 can be located on the recipient bank computer system 117. The OCR system 117 determines the characters and their locations by optical character recognition algorithms. In an example embodiment, the OCR system 117 may determine of a level of certainty that a character has been correctly recognized. For example, if the level of certainty is above a first threshold (e.g., 70%), the character may be considered correctly recognized. If the level of certainty is below a first threshold (e.g., 50%), the character may be considered unrecognizable, and the user may be prompted to manually enter the character. If the level of certainty is between the first and second thresholds, the character may be considered uncertain, and the user may be prompted to confirm that the character was correctly recognized or to manually enter a different character.

The recipient bank computer system 120 includes account processing logic 122, account database 124, network interface logic 127, and an account directory 129. The computer system 120 may be operated by a first banking entity that maintains and handles transaction processing for the recipient's accounts. The computer system 120 is configured to store information regarding the recipient's accounts. By way of example, information for a specific recipient account, designated by reference numeral 125, is shown as being stored in a database 124. As will be appreciated, database 124 may also store information regarding many other accounts (not shown).

The recipient bank computer system 120 may receive requests to deposit funds from a mobile device 110 in the form of a check deposit request. The mobile check deposit system 140 may be part of a single or a distributed computer system that are part of the recipient bank computer system 120. The mobile check deposit system 140 includes a MICR scanning logic 142, request MICR logic 144, and check deposit logic 146. The check deposit request may include the amount of the funds to be deposited, the account into which the funds are to be deposited, and one or more images of the physical check(s) that were captured by a mobile device 110. The mobile check deposit system 140 is configured to determine the bank information (e.g. routing number, account number, check number) that is written on the image of the check.

The account 125 holds funds that are transmitted to the recipient upon receiving check deposit instructions from the recipient through the mobile device 110. As described below, funds may flow into and out of the account 125 through the ACH system 150. The recipient bank computer system 120 is connected to the source account bank computer system 130 and the ACH system 150 through the network 160. Network interface logic 127 may include, for example, program logic that connects the computer system 120 to the network 160.

The MICR scanning logic 142 receives an image of a check sent by the mobile device 110. The MICR scanning logic 142 includes an OCR system that determines the numbers and characters in the MICR line of the check that is being deposited using the mobile device 110. When the MICR scanning logic 142 determines that each character of the MICR line is recognizable with a high degree of accuracy (e.g. greater than 70% level of certainty), then the scan account and routing numbers are sent to the check deposit logic 146. Next, the check deposit logic 146 may transmit the amount, and the account details to the ACH system to trigger the transfer of funds to the account 125 of the recipient. However, when the MICR scanning logic 142 determines that one or more characters is not machine recognizable, then the MICR request logic 144 may query the user to manually input the unrecognized MICR characters. The MICR request logic 144 may identify the characters that are unrecognized, and then send open spaces at the character locations that are unrecognized to the mobile device with a message for the recipient to manually input the missing numbers or characters. In one implementation, the MICR request logic 144 may create a MICR line with spaces for the numbers or characters that were not machine recognized. In particular, the characters and number that were recognized may be unchangeable for the check deposit transaction and the recipient will be blocked from editing the recognized numbers or characters.

The source account computer system 130 includes account processing logic 132, accounts database 134, and network interface logic 137. The bank account logic 139 may be operated by a second banking entity that maintains and handles transaction processing for source accounts. The database 134 may store information for a source account, designated by reference numeral 135 in FIG. 1. The source account 135 may be a demand deposit account held by a user with another financial institution that wrote a check to the recipient. Although in the illustrated embodiment the computer systems 120 and 130 are shown as being separate and as communicating through a network 160, it will be appreciated that the computer systems 120 and 130 may also be integrated in a single payment processing system (e.g., if the two financial institutions are the same).

The Automatic Clearing House (ACH) system 150 is used to transmit funds from the source account to the recipient account (either directly or indirectly through the ACH system). As is known, the ACH Network is a nationwide batch-oriented electronic funds transfer system which provides for interbank clearing of electronic payments for participating depository financial institutions. An ACH entry can start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it be debit or credit) towards an account without prior authorization from the Receiver. Once authorization is received, the Originator then creates an ACH entry to be given to an Originating Depository Financial Institution (ODFI), which can be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified.

Figure 2:
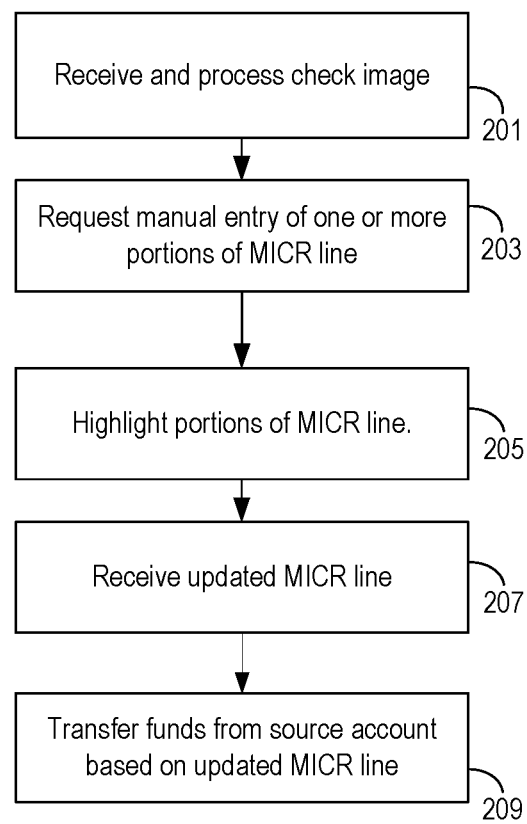
FIG. 2 is a process implemented by the payment processing system of FIG. 1 to make a check deposit using a mobile device.

FIG. 2 is an example process that can be implemented by the check processing system 100 of FIG. 1 to deposit a check. At block 201, the recipient bank computer system 120 receives a check image for funds to be deposited into account 125. For example, the user may use the mobile device 110 to capture an image of a check and send it to the mobile check deposit system 140. After receiving the check image, the MICR scanning logic 142 determines whether the MICR line of the check is machine recognizable. If one or more characters in the MICR line are not recognized by the MICR scanning logic 142, then at block 203, the MICR request logic 144 requests the manual entry of one or more portions of the MICR line for the received check image. At block 205, the portions of the MICR line that requires user entry may be highlighted. When the user is prompted to enter the unrecognized characters, only the highlighted portions need to be manually entered. In one embodiment, the user is not permitted to edit those portions of the MICR line that were correctly recognized. After the manual entry, the updated MICR line is received at block 207. The updated MICR line at block 207 identifies at least the routing number and the account number that is the source of the funds for the check deposit transaction. Next at block 209, the funds may be received by the recipient account 125 based on the updated MICR line.

Figure 3:
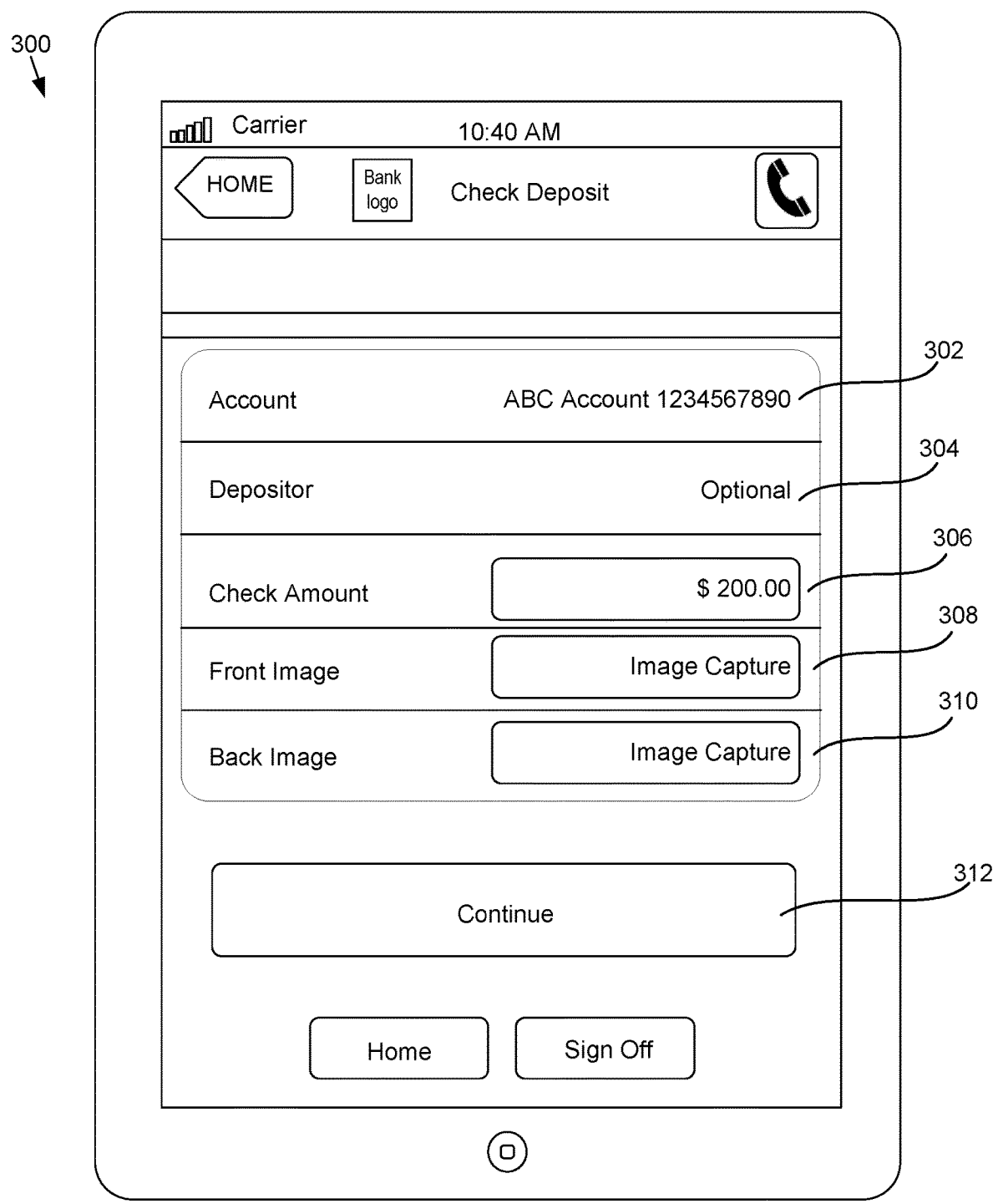
FIG. 3 is an example screen that may be shown on a mobile device to initiate a mobile check deposit.
Figure 4A:
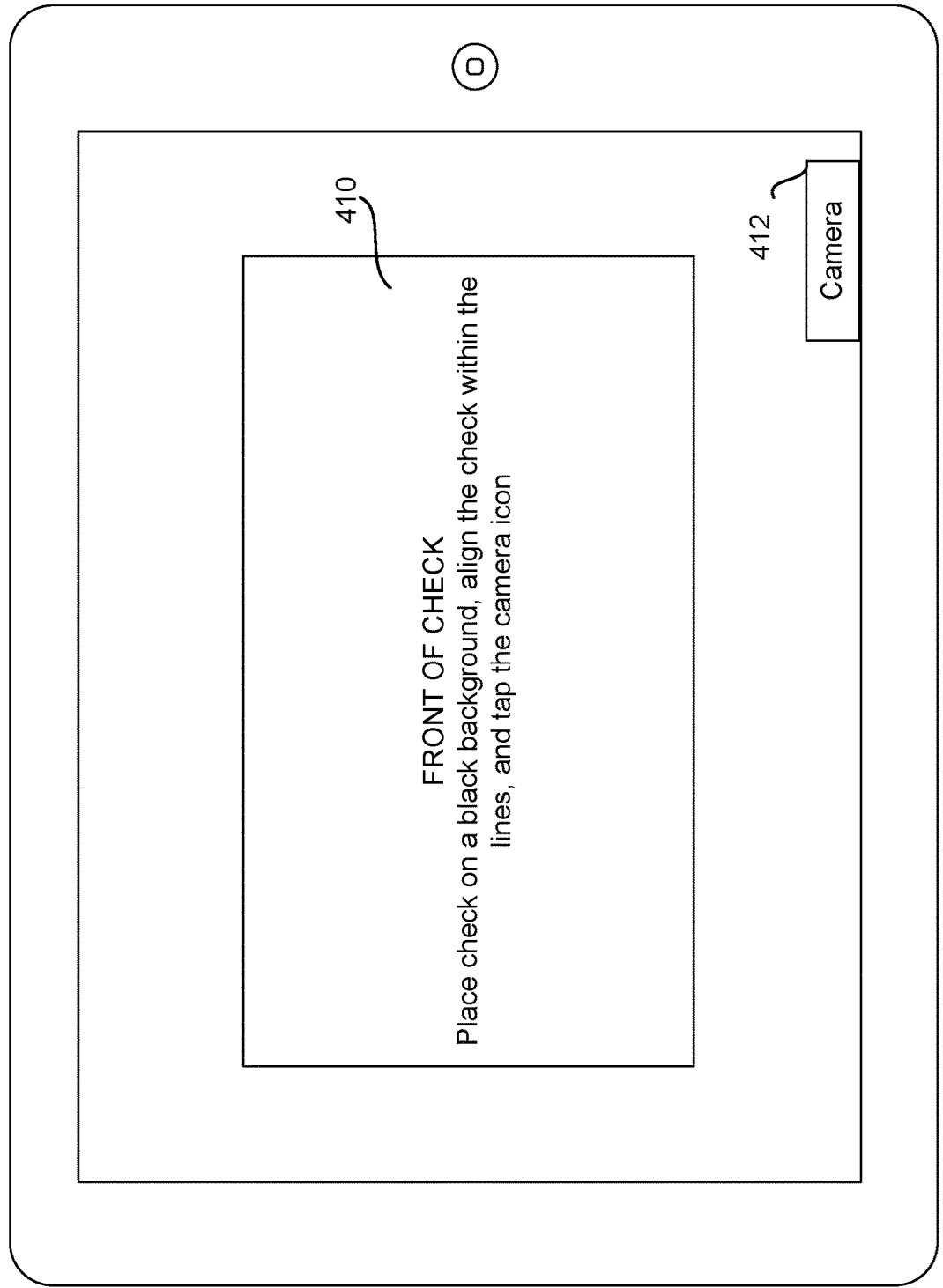
FIG. 4*a* is a screen shot to capture the image of the front of the check.
Figure 4B:
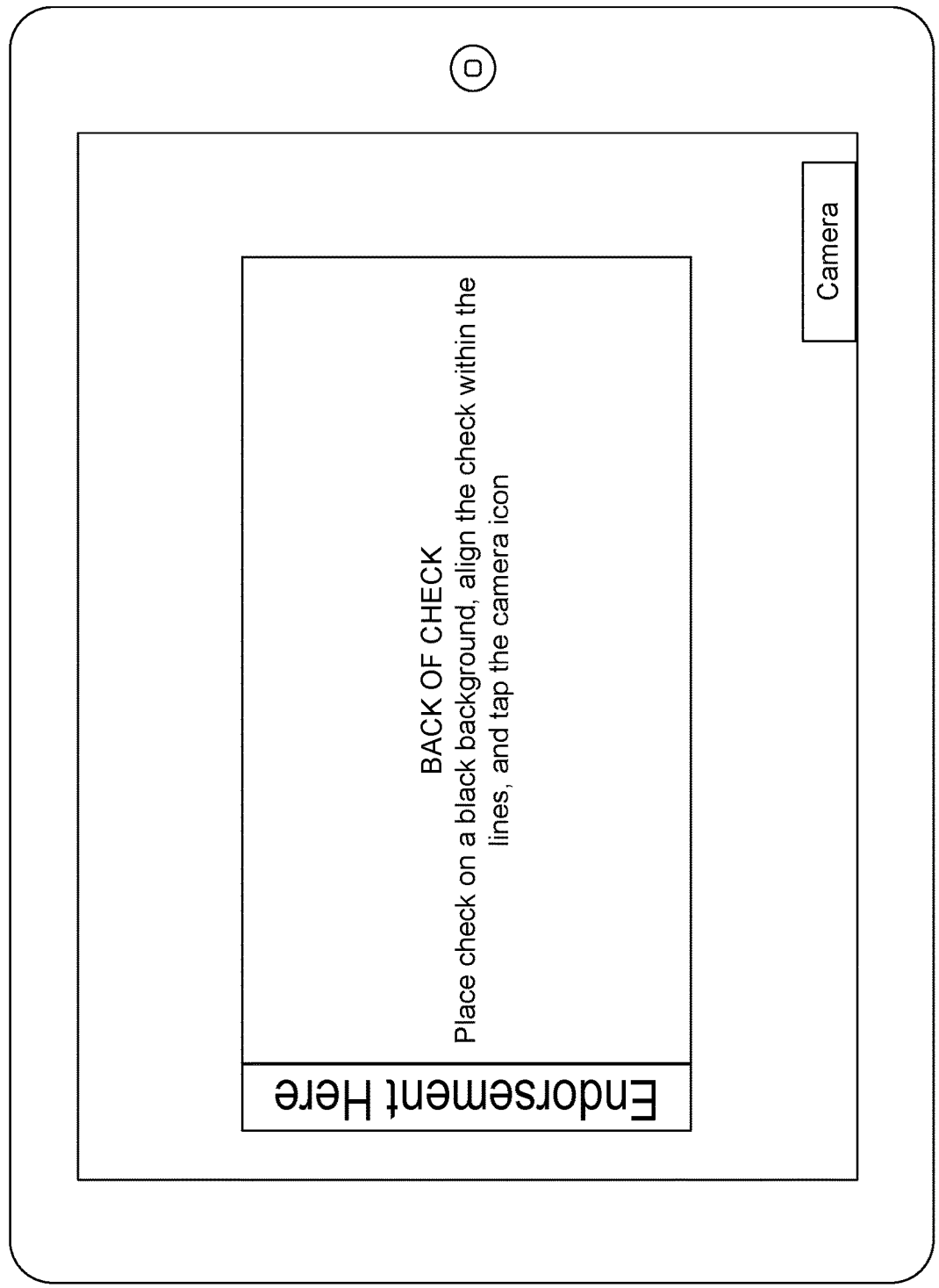
FIG. 4*b* is a screen shot to capture the image of the back of the check.

FIG. 3 is an example screen 300 that is shown on mobile device 110 to initiate a mobile check deposit. The user may choose from one or more accounts 302 to receive the funds from the check deposit. In the example shown, the user chooses to deposit funds to an account 302 ("ABC Account 1234567890"). Accordingly, account 302 corresponds to the recipient account 125 described above in connection with FIG. 1. The user may have received a previous deposits from the writer of the check and may choose a depositor 604 from a plurality of depositors that are stored on the mobile device 110. As shown in screen 300, the depositor 304 is an optional field that may be filled out by the user. In order to deposit a check the user may enter a check amount 306. In the example shown, the check amount is $200. The user may navigate menu selections to upload one or more images of the check at front image and back image menu items. When a user selects the image capture button 308, a screen as shown in FIG. 4a may be displayed to facilitate capturing an image of a front of the check. When a user chooses to select the image capture button 310, a screen as shown in FIG. 4b may be displayed to facilitate capturing an image of a back of the check. The continue button 312 may be selectable once the user provides input for the account 302, check amount 306, and image capture buttons 308 and 310.

FIG. 4a is a screen shot to capture the image of the front of the check. The screen in FIG. 4a displays a rectangular guide box that is overlaid over the image that is being captured by the image capture device 116. Inside the guide box 410, instructions may be provided to the user regarding how to capture the front of the check. For example, guide box 410 recites, "place check on a black background, align the check within the lines and tap the camera icon." In one embodiment, the lines at the edge of the guide box 410 maybe colored red until the front of the check is detected by the image capture device 116. Upon detecting that a check is within the lines of the guide box 410, the color of the guidelines may change to green from red to provide visual feedback to the user to press the camera 412 button. Pressing the camera 412 button activates the digital shutter mechanism and an image is stored in the memory of the mobile device 110. Similar to FIG. 4a, FIG. 4b is a screen shot to capture an image of the back of the check.

Figure 5:
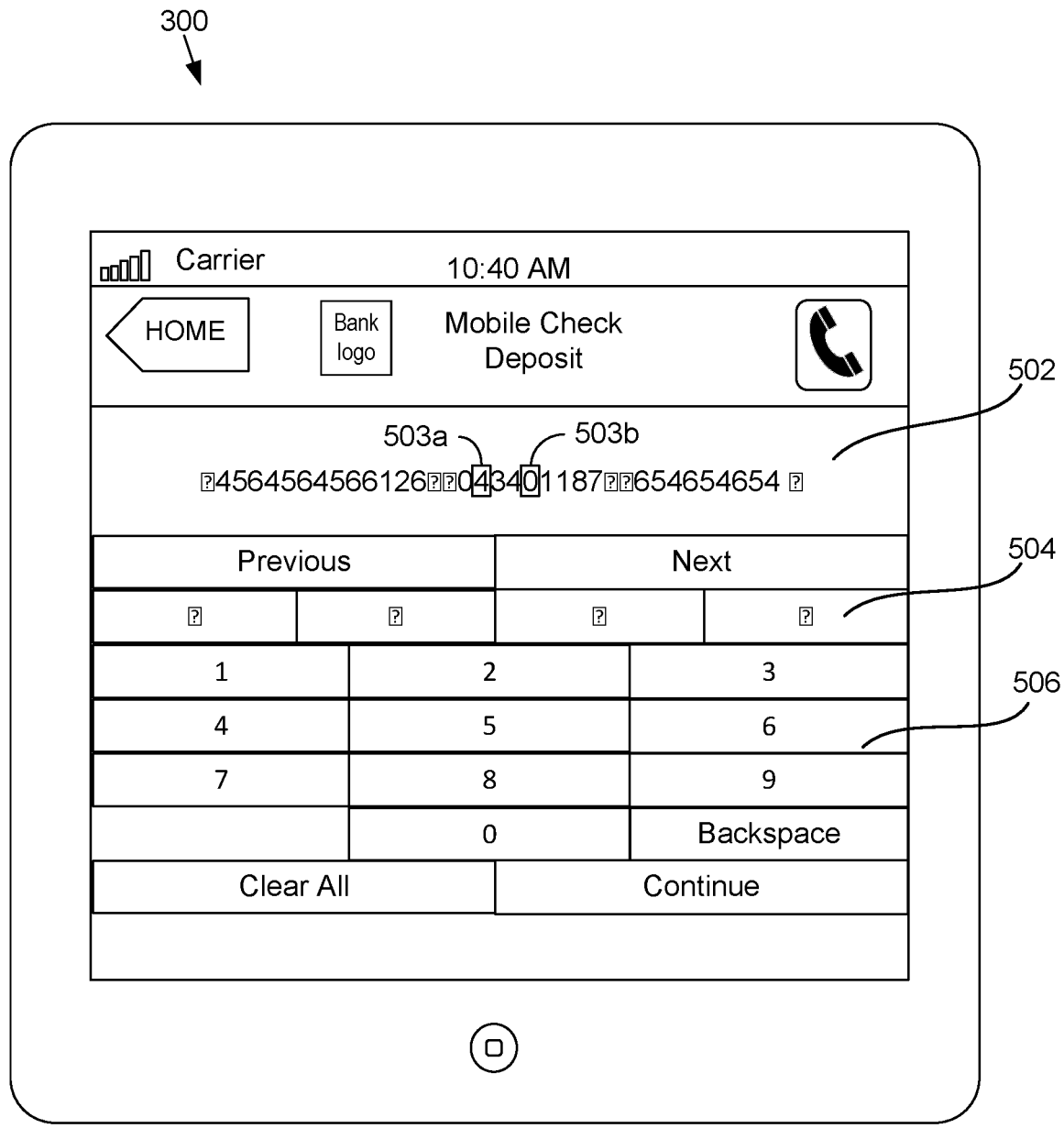
FIG. 5 is a screen shot showing a special keyboard and the user editing a portion of an example MICR line.

FIG. 5 is a screen shot showing a special keyboard presented for the user to edit a portion of an example MICR line. In FIG. 5, it is assumed that at least some characters were not recognizable, and the user is prompted to manually enter the missing portions of the MICR line. A portion of the MICR line is highlighted as shown in field 502. For example, the mobile device shows the highlighted portions 503a and 503b to the user. In particular, the user is requested to type in the correct values into fields 503a and 503b. Also displayed in FIG. 5 is a special keyboard that allows the user to type in various MICR line symbols 504 and numeric digits 506. The user may chose which of the highlighted choices to edit first by choosing next or previous buttons.

Figure 6:
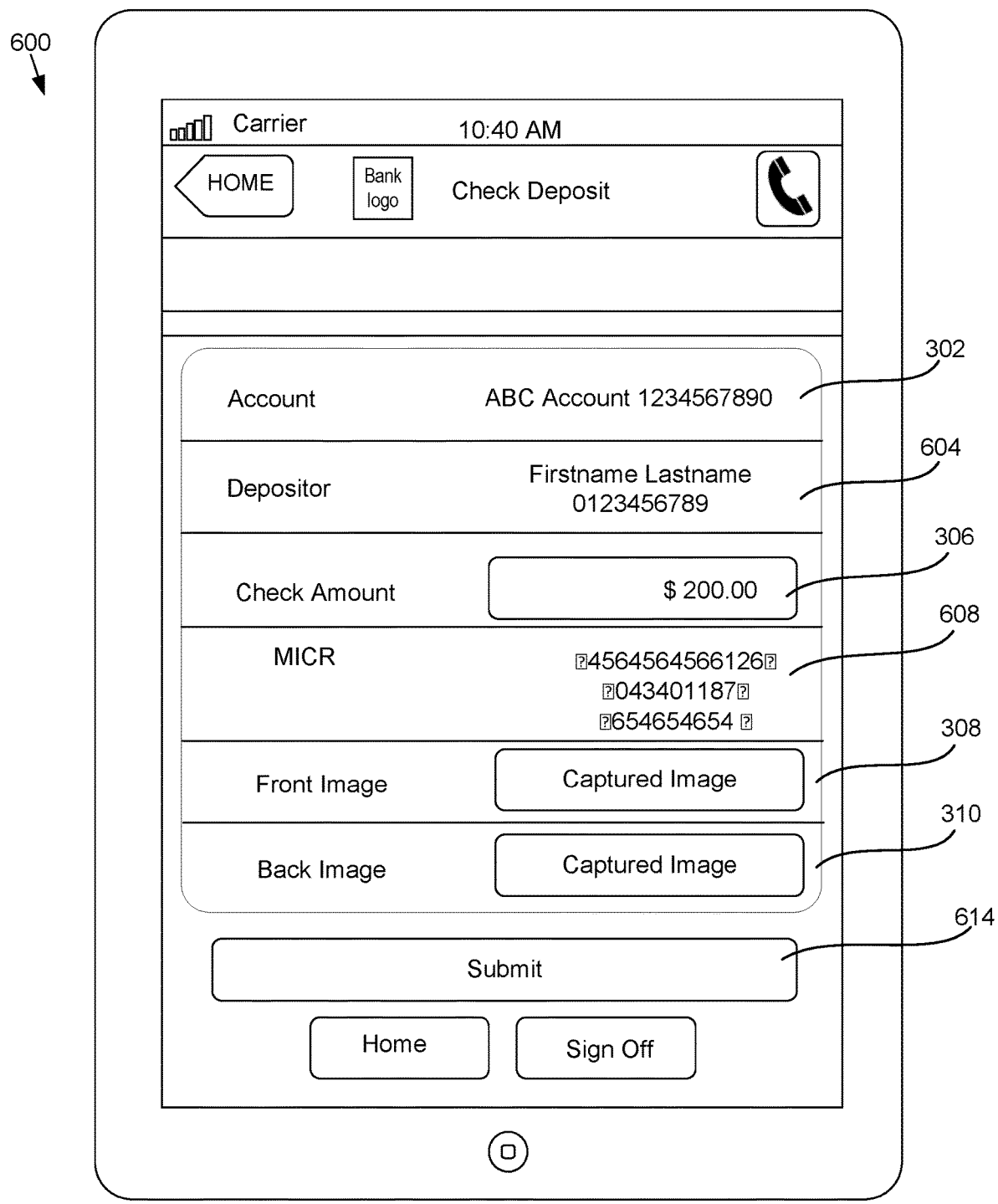
FIG. 6 is a screen shot of a verification screen that includes the MICR line for mobile deposit.

FIG. 6 is a screen shot of a verification screen that includes the MICR line as input by the user in FIG. 5 for mobile deposit. The account 302 and check amount 306 may be similar to screen shot from FIG. 3. However, thumbnails of the front and back images of the check may be displayed on image capture buttons 308 and 310. Further, FIG. 6 also allows a user to input the first name, last name and account number of the depositor 604 (i.e. check writer). Also shown in FIG. 6 is the MICR number 608 that allows the user to view the check in their hand or a the image from captured image 308. Upon verifying the MICR number, the user may choose to submit the check information using the submit button.

The embodiments of the mobile check deposit are described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function..

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A computer-implemented method, comprising:
   receiving, by a computing system, a check image corresponding to a check from a mobile device associated with a user attempting to deposit the check at a bank;
   responsive to a determination that a first portion of a line depicted in the check image is recognized and that a second portion of the line is unrecognized, transmitting, by the computing system, a request to the mobile device requesting a manual entry of at least the second portion of the line of the check image;
   receiving, by the computing system, a manually entered portion of the line from the mobile device; and
   combining, by the computing system, the manually entered portion of the line with the first portion of the line to form a complete line.

2. The computer-implemented method of claim 1, wherein the line identifies at least a routing number and an account number associated with a bank account.

3. The computer-implemented method of claim 1, wherein the line is a Magnetic Ink Character Recognition (MICR) line of the check.

4. The computer-implemented method of claim 1, wherein the second portion is determined to be unrecognized based on an output of an optical character recognition process.

5. The computer-implemented method of claim 1, further comprising identifying, by the computing system, one or more unrecognized characters in the line.

6. The computer-implemented method of claim 5, wherein identifying the one or more unrecognized characters in the line comprises performing, by the computing system, a recognition algorithm on the line.

7. The computer-implemented method of claim 6, wherein the recognition algorithm comprises optical character recognition (OCR).

8. The computer-implemented method of claim 5, wherein the request is transmitted in response to the identifying one or more unrecognized characters in the line.

9. The computer-implemented method of claim 5, wherein the request for the manual entry corresponds to the one or more unrecognized characters in the line.

10. The computer-implemented method of claim 9, wherein the manually entered portion comprises the one or more unrecognized characters, and wherein the complete line is formed by combining the first portion of the line with the one or more unrecognized characters received from the mobile device.

11. The computer-implemented method of claim 1, wherein requesting the manual entry of at least the second portion of the line further comprises highlighting, by the computing system, the second portion of the line.

12. The computer-implemented method of claim 11, wherein highlighting the second portion of the line comprises at least one of blinking, underlining, showing a blank space, or drawing a box around the second portion of the line.

13. The computer-implemented method of claim 1, wherein requesting the manual entry of at least the second portion of the line further comprises generating, by the computing system on the mobile device, an input device structured to facilitate an input of the manual entry of at least the second portion.

14. The computer-implemented method of claim 13, wherein generating the input device further comprises generating, by the computing system, a special keyboard comprising one or more line characters.

15. A computing system comprising:
a network interface structured to connect the computing system to a network; and
a processor and a memory comprising instructions which, when executed by the processor, configure the computing system to:
receive, from a mobile device associated with a user, a check image corresponding to a check to be deposited at a bank;
responsive to determining that a first portion of a line depicted in the check image is recognized and a second portion of the line is unrecognized, transmitting a request to the mobile device requesting a manual entry of at least the second portion of the line of the check image;
receiving, from the mobile device, a manually entered portion of the line of the check image; and
combining the manually entered portion of the line with the first portion of the line to form a complete line.

16. The computing system of claim 15, wherein the line is an MICR line that identifies at least a routing number and an account number associated with a bank account.

17. The computing system of claim 15, wherein the second portion requested is determined to be unrecognized based on an output of an optical character recognition process.

18. The computing system of claim 15, further comprising identifying one or more unrecognized characters in the line, wherein the request is transmitted following identification of one or more unrecognized characters in the line.

19. The computing system of claim 18, wherein the manually entered portion comprises the one or more unrecognized characters, and wherein the complete line is formed by combining the first portion of the line with the one or more unrecognized characters received from the mobile device.

20. The computing system of claim 15, wherein requesting the manual entry of at least the second portion of the line further comprises highlighting the second portion of the line, wherein highlighting the second portion of the line comprises at least one of blinking, underlining, showing a blank space, or drawing a box around the second portion of the line.

* * * * *